United States Patent [19]

Jayawant et al.

[11] Patent Number: 5,467,244
[45] Date of Patent: Nov. 14, 1995

[54] APPARATUS FOR THE ELECTROMAGNETIC CONTROL OF THE SUSPENSION OF AN OBJECT

[75] Inventors: Bhalchandra V. Jayawant, Kingston; Raymond J. Whorlow, Brighton, both of United Kingdom

[73] Assignee: British Nuclear Fuels plc, Cheshire, United Kingdom

[21] Appl. No.: 986,735

[22] Filed: Dec. 8, 1992

[30] Foreign Application Priority Data

Jan. 3, 1992 [GB] United Kingdom .................. 9200086
Sep. 22, 1992 [GB] United Kingdom .................. 9219959

[51] Int. Cl.[6] ................................................. H02N 15/00
[52] U.S. Cl. ........................... 361/144; 361/187; 361/188
[58] Field of Search ................................... 324/654–657; 361/139, 143, 144, 145, 146, 154, 179, 187, 180, 210, 188; 310/90.5

[56] References Cited

U.S. PATENT DOCUMENTS

| 2,946,930 | 7/1960 | Gilbert | 361/144 |
|---|---|---|---|
| 3,797,403 | 3/1974 | Schwarzler et al. | 104/284 |
| 4,910,633 | 3/1990 | Quinn | 361/144 |
| 5,227,948 | 7/1993 | Boon et al. | 361/144 |
| 5,243,491 | 9/1993 | Van Eijk et al. | 361/144 |
| 5,264,982 | 11/1993 | Cox et al. | 361/144 |

OTHER PUBLICATIONS

"Fast frictionless rotation" by P. N. Murgatroyd, Electrical Review vol. 203, No. 3, 21 Jul. 1978.

Primary Examiner—A. D. Pellinen
Assistant Examiner—Fritz M. Fleming
Attorney, Agent, or Firm—Nixon & Vanderhye

[57] ABSTRACT

An apparatus for the electromagnetic control of the suspension of an object including an electromagnet including an inductive coil, a source of electric power for the electromagnet which source includes a controllable electric supply device capable of delivering a controlled electric supply to the coil of the electromagnet, a control signal producer for producing an error control signal in response to an incremental change in a parameter related to the position of the object relative to the electromagnet and a negative feedback control loop for feeding an error control signal generated by the control signal producer to the electrical supply device to adjust the electrical supply to the coil so as to stabilise the suspension of the object relative to the electromagnet, wherein the control signal producer includes a detector for detecting the component $V_L$ of voltage across the coil which is due to pure inductance L of the coil, a detector for detecting the current i flowing through the coil, a device for deriving from the detected value of $V_L$ and the detected value of i opposing signals and a balances for balancing the opposing signals whereby an error control signal generated by the control signal producer represents a deviation from the perfect balance of the opposing signals and causes a correction signal to be applied by the electrical supply to restore the balance.

21 Claims, 8 Drawing Sheets

APPARATUS FOR THE ELECTROMAGNETIC CONTROL OF THE SUSPENSION OF AN OBJECT

RELATED APPLICATIONS

An Application of even date by John Frederick Curtis et al assigned to the present Assignee and claiming priority from UK Patent Applications 9200087.6 and 9222017.7 and a corresponding U.S. application Ser. No. 07/986,733, based thereon, was filed Dec. 8, 1992 and abandoned in favor of U.S. Continuation application Ser. No. 08/347,066.

RIGHTS ARISING FROM FEDERALLY SPONSORED RESEARCH

Nil.

The present invention relates to apparatus for the electromagnetic control of the suspension of an object.

Electromagnetic control of the position of an object by suspension or levitation has been employed in a number of commercial applications in the field of industrial engineering. Such applications have included passenger-carrying vehicles, conveyor systems, flow meters, frictionless bearings, tool spindles, centrifuges, alternators, pumps, compressors and balances. The present invention is concerned with systems for the electromagnetic control of the suspension of an object which are suitable for use in such applications and which systems are of the kind including an electromagnet, a source of electric power for the electromagnet which source includes a controllable electric supply device capable of delivering a controlled electric supply to the electromagnet, a control signal producer for generating an error control signal in response to an incremental change in a parameter related to the position of the object relative to the electromagnet and a negative feedback control loop for feeding an error control signal generated by the control signal producer to the electric supply device to adjust the electrical supply to the electromagnet so as to stabilise the suspension of the object relative to the electromagnet.

In systems known in the prior art the position of the object has been stabilised by monitoring the position of the object relative to the electromagnet and producing an error control signal in the manner described to stabilise the position of the object following random disturbances to the suspension of the object caused by changes in the overall force acting upon the object. In some applications the rate of change of relative position of the object has been stabilised either together with the position, or as a separate control, by monitoring the rate of change of position of the object relative to the electromagnet and producing an error control signal in the manner described to stabilise the rate of change of position or, in other words, to damp oscillations of the object, caused as a result of random disturbances to the suspension of the object. In the latter case the error control signal may be generated by measuring relative position and differentiating the signal produced or by measuring the rate of change of relative position directly. An example of an application where rate of change of position is controlled without relative position per se is a shaft damper employed on long shafts, eg a propeller shaft on a ship.

The relative position of the object is the separation or gap between the control electromagnet and the object being controlled and in the prior art systems is monitored by a transducer forming part of the control signal generator for the feedback loop. Such transducers have included devices which are photocells (detecting the interruption of a light beam by movement of the object); magnetic (comprising a gap flux density measurement device, eg Hall plate); inductive (eg employing two coils in a Maxwell bridge which is in balance when the inductance of the coils is equal); I/B detectors (in which the ratio of the electromagnet coil current and magnetic flux produced is determined to provide a measure of the gap between electromagnet and object; for small disturbances the division may be replaced by a subtraction); and capacitive (employing an oscillator circuit whose output frequency varies with suspension gap).

Direct measurement of the rate of change of position has been carried out in the prior art by "derivative transducers" such as a coil wound around a permanent magnet.

The use of the gap or derivative measurement transducers in prior systems has not been entirely satisfactory. Usually, the transducer has an upper temperature limit of operation. The transducers have a discrete physical size and the space occupied by the transducer reduces the space available for the electromagnet and therefore the force which can be exerted on the object.

This problem is significant where the object is a shaft which is able to bend, eg at a resonant rotation frequency in its so-called "free-free" mode, confining the positions in which the transducer may be located.

SUMMARY OF THE INVENTION

According to the present invention there is provided an apparatus for the electromagnetic control of the suspension of an object including an electromagnet including an inductive coil, a source of electric power for the electromagnet which source includes a controllable electric supply device capable of delivering a controlled electric supply to the coil of the electromagnet, a control signal producer for producing an error control signal in response to an incremental change in a parameter related to the position of the object relative to the electromagnet and a negative feedback control loop for feeding an error control signal generated by the control signal producer to the electric supply device to adjust the electrical supply to the electromagnet so as to stabilise the suspension of the object relative to the electromagnet, wherein the said control signal producer includes means for detecting the component $V_L$ of voltage across the coil of the electromagnet which is due to pure inductance L of the electromagnet, means for detecting the current i flowing through the coil of the electromagnet, means for deriving from the detected value of $V_L$ and the detected value of i opposing signals and means for balancing the opposing signals whereby an error control signal generated by the control signal producer represents a deviation from the perfect balance of the said opposing signals and causes a correction signal to be applied by the electrical supply to restore the balance.

Balancing of the said opposing signals may provide one or more of proportional and derivative control of the suspension of the object. In such forms of control the restoring force required to balance a perturbation caused by a random disturbance to the suspension of the object is proportional respectively to the relative position of the object or to the rate of change of the relative position of the object.

The said opposing signals may comprise a signal proportional to or representing the measured value of $V_L$ which has been integrated with respect to time and balanced against a signal proportional to or representing the measured value of i to give proportional control.

Alternatively, or in addition, the said opposing signals may comprise a signal proportional to or representing the measured value of $V_L$ balanced against a signal which is the time derivative of a signal proportional to or representing the measured value of i to give derivative control.

Thus, the required form of control is obtained by deriving opposing signals by suitable integration or differentiation with respect to time of one of the signals representing $V_L$ and i and comparing it with the other.

Where two or more types of control, eg proportional and derivative control, are required to be provided together the apparatus according to the present invention may comprise a plurality of parallel circuits or loops for generating the respective pairs of opposing signals (derived from $V_L$ and i) employed to provide an error control signal to give the required form of feedback control.

The said electromagnet may comprise in its most usual form a magnetic core on which an inductive coil is provided (through which current is supplied to energise the electromagnet). However, the electromagnet may alternatively be an inductive coil without a magnetic core.

The said object may be any of the objects of types known to be influenced by the magnetic field generated by an electromagnet, eg a magnetic material, a permanent magnet, an electromagnet or a current-carrying conductor.

The electric supply device may comprise a controlled power amplifier circuit connected to a fixed voltage source, thereby delivering a controlled direct current of a controlled level to the coil of the electromagnet.

The amplifier of the said amplifier circuit is preferably a high gain amplifier and may be an amplifier of any one of classes A, B, C, D and E. Preferably, the gain of the amplifier is greater than 200, desirably greater than 500.

The voltage V across the terminals of an electrical coil of an electromagnet is given by the equation:

$$V = iR + L\frac{di}{dt} + i\frac{dL}{dt} \qquad \text{Equation 1}$$

where R is the resistance of the coil, i is the current passing through the coil and L is the inductance of the coil. The said means for detecting the parameters i and $V_L$ measure respectively the resistive component equal to the term iR in the voltage V expressed in Equation 1 and also the inductive component equal to the sum of the terms $L^{di}/_{dt}$ and $i^{dL}/_{dt}$. These last two terms may alternatively be expressed as $N^{d\emptyset}/_{dt}$ where N is the number of turns of the coil and $\emptyset$ is the magnetic flux developed due to inductance of the coil when carrying current. For proportional control the said control signal producer integrates $N^{d\emptyset}/_{dt}$ and sets this equal to the term iR (by the said means for balancing the opposing signals derived from $V_L$ and i).

The effect of the operations performed by the said control signal producer for proportional control may be expressed as follows.

The voltage component across the coil due to pure inductance L of the coil $V_L$ is given by $$V_L = N^{d\emptyset}/_{dt} \qquad \text{Equation 2}$$

the intergral of $V_L$ is given by $$\int V_L \, dt = N\emptyset + K_1 \qquad \text{Equation 3}$$

where $K_1$ is a first constant and N is a second constant (as stated above representing the number of turns in the coil).

The balancing of the integral of the voltage component across the coil due to pure inductance L and the voltage component due to pure resistance R of the coil may be represented by:

$$\int V_L \, dt - K_3 i = 0 \qquad \text{Equation 4}$$

where $K_3$ is a third constant and i is the current through the coil.

By combining with Equation 3, Equation 4 becomes:

$$N\emptyset + K_1 - K_3 i = 0 \qquad \text{Equation 5}$$

The known relationship between the flux $\emptyset$ linking to an object a distance x from an electromagnet comprising a coil carrying a current i is:

$$\emptyset = ^i/K_4 x \qquad \text{Equation 6}$$

where $K_4$ is a fourth constant.

By combining with Equation 5, Equation 6 for proportional control by the apparatus of the present invention becomes:

$$\emptyset(N - K_3 K_4 x) = -K_1 \qquad \text{Equation 7}$$

Thus, by rearranging Equation 7 the expression for becomes:

$$\phi = \frac{K_1}{K_3 K_4 x - N} \qquad \text{Equation 8}$$

The known relationship between the force F on the object and the flux $\emptyset$ (where $K_5$ is a constant) is:

$$F = K_5 \emptyset^2 \qquad \text{Equation 9}$$

Finally, by combining Equation 9 with Equation 8:

$$F = K_5 \left( \frac{K_1}{K_3 K_4 x - N} \right)^2 \qquad \text{Equation 10}$$

or $$F = \left( \frac{K_A}{K_B x - K_C} \right)^2$$

where $K_A$, $K_B$ and $K_C$ are alternative constants.

The relationship between total force F acting upon the object and distance x from the electromagnet to the object is therefore given by Equation 10 and, as illustrated below (FIG. 2), in the working region of the curve graphically representing this relationship, the curve approximates locally to a straight line of positive slope similar to that representing the simple analogous relationship of force v extension for a spring obeying Hooke's law. The effect of this relationship is that the control of the total force The parameters $\int V_L \, dt$ and $K_3 i$ as in Equation 4 may acting upon the object is proportional control be monitored by measuring $V_L$ and iR which are respectively the inductive and resistive components of the voltage across the coil.

It can be shown by analysis that by deriving parameters V' and i' which are respectively phase lagged versions of V and i defined above a system may be built which also operates in the manner described by Equation 10. The control signal producer of the apparatus according to the present invention may therefore include sensors capable of sensing the parameters V and i, means for deriving the parameters V' and i' therefrom and means for processing the measured values of these parameters to provide an error control signal for the electric supply device which provides proportional control of the suspended object.

The means for sensing the voltage V across the coil and the means for sensing the current i may comprise known means. For example, the component of voltage V may be measured directly by a separate search coil wound on a magnetic core which searches for changes in magnetic flux. The current i may be measured by a separate ferromagnetic, eg ferrite, ring plus Hall plate.

The parameters $V_L$ and i may however be measured by a processing circuit connected directly to the respective terminals of the coil and these parameters are preferably measured in this way.

The present invention therefore allows proportional control of the electromagnetic suspension of an object by an electromagnet to be achieved without the use of separate transducers, ie without transducers not physically connected to the coil as in the prior art. Such proportional control provides stiffness to oscillations of the object about its mean position caused by fluctuations in the power supply. High stiffness implies that little movement will occur when an oscillating force is applied (assuming the frequency is not close to the resonant frequency of the system).

For example, a processing circuit for proportional control may comprise an operational amplifier having its inputs provided by resistive connections to the coil terminals; the operational amplifier may be connected to provide an output to an integrator whose output in turn forms one input to a further operational amplifier having another input provided by a resistive connection to the electromagnet coil, the output of the further operational amplifier providing an error control signal for the electric supply device, eg power amplifier circuit, providing current supply to the coil. An example of the construction and operation of such a circuit is described in further detail below.

As illustrated in more detail below, where such a circuit is connected to the terminals of the coil to measure the values of voltage across and current through the coil, so-called derivative control by ensuring that a positive component of current exists at the output of the circuit, another desirable known kind of control, is additionally achieved in which there is an approximately linear relationship of positive slope between the total force acting upon the suspended object and the time derivative of the relative position of the object.

Such derivative control provides desirable damping to oscillations of the object about its mean position caused by random disturbances to the suspension of the object. High damping implies that little velocity will occur when an oscillating force is applied.

In a number of systems it is desirable to provide both stiffness and damping of random oscillations. A lower mechanical impedance results from higher stiffness and/or damping.

A preferred alternative way of achieving derivative control in addition to the aforementioned proportional control in apparatus according to the present invention is as follows. A signal representing the measured value of the parameter $V_L$ defined above is balanced against a signal representing the measured value of the parameter di/dt where i is the current through the coil and any difference between the balanced signals is employed as an error control signal in a feedback loop and applied, together with the aforementioned error control signal, to the electrical supply to the coil. Thus, it is preferred to have in parallel with the aforementioned negative feedback control loop providing proportional control an additional negative feedback loop providing derivative control in the manner described. Such derivative control together with the aforementioned proportional control may be achieved without the use of separate transducers.

Thus, as well as providing a novel means of providing proportional and derivative control of the electromagnetic suspension of an object the present invention allows the problems associated with separate transducers as described hereinbefore to be avoided. Electromagnetic control of the suspension of an object may be achieved at higher temperatures which could otherwise harm the separate transducers as used in the prior art and greater electromagnetic control force per unit area may be obtained. As the measurement system can be formed by using less discrete parts, suspension control may be achieved more cheaply and more reliably than with prior art systems.

It can be shown in the following way that both proportional and derivative control achieved in the manner described above can give both damping and stiffness to oscillations caused by a random disturbance to the suspension of the object.

For small perturbations the force F acting upon the controlled object is proportional to flux Ø produced by the electromagnet:

$$F = c_1 \emptyset \qquad \text{Equation 11}$$

Also current i through the coil of the electromagnet and position x of the object relative to the electromagnet are related:

$$i = c_2 x + c_3 \emptyset \qquad \text{Equation 12}$$

To control stiffness and damping force is required to be a function of x and dx/dt:

$$\text{ie } \phi = c_5 x + c_6 \frac{dx}{dt} \qquad \text{Equation 13}$$

The 'pure inductance' voltage $V_L$ is given in Equations 2 and 3 above.

From Equation 3:

$$\int V_L dt = N\emptyset + c_7 \qquad \text{Equation 14}$$

From Equation 12:

$$x = \frac{i}{c_2} - \frac{c_3 \phi}{c_2} \qquad \text{Equation 15}$$

From Equation 15:

$$\frac{dx}{dt} = \frac{1}{c_2} \frac{di}{dt} - \frac{c_3}{c_2} \frac{d\phi}{dt} \qquad \text{Equation 16}$$

Substituting Equations 15 and 16 into Equation 13:

$$\phi = \frac{c_5 i}{c_2} - \frac{c_5 c_3 \phi}{c_2} + \frac{c_6}{c_2} \frac{di}{dt} - \frac{c_6 c_3}{c_2} \frac{d\phi}{dt} \qquad \text{Equation 17}$$

From Equation 2:

$$\frac{d\phi}{dt} = \frac{V_L}{N} \quad \text{Equation 18}$$

From Equation 14:

$$\phi = \frac{1}{N}(\int V_L dt - c_7) \quad \text{Equation 19}$$

Substituting Equations 18 and 19 into Equation 17:

$$\frac{1}{N}(\int V_L dt - c_7) = \frac{c_5}{c_2} i - \frac{c_5 c_3}{N c_2}(\int V_L dt - c_7) + \quad \text{Equation 20}$$

$$\frac{c_6}{c_2}\frac{di}{dt} - \frac{c_6 c_3}{c_2}\frac{V_L}{N}$$

$$\frac{c_5}{c_2} i + \frac{c_6}{c_2}\frac{di}{dt} - \left(\frac{c_5 c_3}{N c_2} + \frac{1}{N}\right)\int V_L dt - \quad \text{Equation 21}$$

$$\frac{c_6 c_3}{c_2}\frac{V_L}{N} + \frac{c_7}{N} + \frac{c_5 c_3 c_7}{N c_2} = 0$$

Which may be re-written as:

$$c_A i + c_B \, didt - c_C \int V_L dt - c_D V_L + c_E = 0 \quad \text{Equation 22}$$

So the requirement to control stiffness and damping stated as Equation 13 is met if Equation 22 is satisfied.

Equation 22 is satisfied by combining:
(a) positive feedback of i;
(b) positive feedback of di/dt;
(c) Negative feedback of $\int V_L dt$;
(d) Negative feedback of $V_L$.

This combination is achieved by having proportional control obtained by balancing a signal representing $V_L dt$ against one representing i and by having derivative control obtained by balancing a signal representing $V_L$ against one representing di/dt as described above. The correct choice of $c_A$, $c_B$, $c_C$, $c_D$ and $c_E$ is required to satisfy Equation 22. There is an effect on stiffness and damping if any controls are varied but predominantly the stiffness is affected by $c_A$ and $c_C$ whilst the damping is controlled by $c_B$ and $c_D$. The parameters may be combined together in a way that allows independent control of stiffness and damping. If $c_B$ and $c_D$ are set to zero then Equation 22 simplifies to:

$$\int V_L dt - \frac{c_A}{c_C} i = \frac{c_E}{c_C} \quad \text{Equation 23}$$

This is of identical form to Equation 4 above.

In any application where changes in the resistance of circuit resistors in apparatus embodying the invention may be caused by changes in temperature of the operating environment such resistors may be variable resistors each controlled to have a fixed resistance value over a range of operating temperatures.

The said control signal producer(s) and feedback loop(s) may be used in conjunction with one or more other sensors and feedback loops to provide control of other parameters related to the suspension of the object by the electromagnet. For example, the deviation between an instantaneous position and a desired mean position of the object may be measured and controlled in one of the ways known in the prior art, eg using one of the known gap measuring methods described above. The inductance of the electromagnet coil may alternatively be measured to provide position control. The inductance is a measure of the distance separating the object from the electromagnet. Control of the inductance therefore allows setting of the distance. The inductance may be measured by one of the prior art methods which are known to those skilled in the art for the measurement of inductance but is desirably measured in the following manner which is a novel technique per se and is the subject of copending UK Patent Application Nos. 9200087.6 and 9222017.7 by the present Assignee.

Connected in series with the first mentioned coil of the electromagnet which for the purpose of reference is herein called the "control coil" is a second coil so that the same current flows through the control coil and the second coil. A resonant circuit is formed by connecting a capacitor to the second coil or to a third coil which is in a mutually inductive relationship with the second coil so that the second and third coils act as the primary and secondary coils of a transformer. An a.c. signal of constant peak voltage amplitude and having a frequency within the resonance peak of the resonant circuit, preferably at the resonant frequency, is injected into the circuit containing the control coil and the second coil. The impedance or inductance of the control coil varies with any incremental change in the distance separating the electromagnet and the suspended object resulting in a varying current component at the a.c. frequency. The tuned circuit provides means for detecting only the a.c. component of the current through the control coil, the amplitude of the a.c. component of current being sensed by measuring, by an amplitude detector, the amplitude of the alternating voltage across a component, eg the capacitor, of the resonant circuit.

Where the said second coil is itself in the resonant circuit the said amplitude detector requires isolation from the d.c. components in the second coil and this may be provided by connecting the respective leads to the said amplitude detector through capacitors.

Where the said second coil is employed together with a third coil as a transformer the a.c. signal injected through the second coil (or primary coil of the transformer) induces a voltage alternating at the same frequency to appear across the third coil (or secondary coil of the transformer). The induced voltage is a measure of the varying a.c. component of the current flowing through the control coil at the applied frequency.

The amplitude of the alternating voltage detected by the said amplitude detector is compared in an error detector with a reference signal comprising a desired mean level, and the error signal comprising variations between the measured amplitude and the desired mean level is integrated in an integrator and thereafter employed as a control signal in a closed negative feedback loop (in parallel with aforementioned loop) connected to the aforementioned controllable electric supply device, eg power amplifier circuit, to adjust the electrical supply to the control coil to maintain the inductance at a desired mean level.

The said injected a.c. signal may be applied as an input to the circuit of the controllable electric supply device and thereby superimposed upon the nominally d.c. output of that device supplied to the control coil. Desirably, although not essentially, the said resonant frequency is greater than the normal audio range and is preferably in the range 15 to 25 kHz, eg 20 kHz.

It can be shown that the control of position of the object by measurement of the inductance of the control coil in the manner described provides so-called integral control of the suspension of the object which is another known desirable kind of control in which the relationship between the total force acting upon the object and the time integral of the incremental distance moved by the object is a linear relationship of positive slope.

Since the measurement of inductance in the manner described may be carried out essentially by connecting a second coil to the control coil the use of a separate transducer may again be avoided. Thus, so-called PID control, which is a combination of proportional, integral and derivative controls, of the object suspension may be achieved without the need for separate transducers, ie without transducers not connected to the control coil.

The apparatus according to the present invention may include a plurality of electromagnets each controlled in the manner of the present invention. For example, a pair of electromagnets working together may be employed to control the suspension of an object in one dimension. Control of such a pair of electromagnets may be achieved by providing a controllable electric supply device connected to each electromagnet, a control signal producer and a feedback loop from the control signal producer to the electric supply device all as described hereinbefore.

An active electromagnetic bearing for a rotating shaft constituting the object being suspended may comprise two pairs of electromagnets controlled in the manner described, the members of each pair working together to control one dimensional suspension, the overall bearing providing two dimensional suspension.

A complete suspension system for a shaft may comprise two or more such active bearings acting radially upon the shaft and one active thrust bearing acting upon an end of the shaft.

Use of apparatus according to the present invention to suspend a rotating shaft advantageously allows the problem of the restriction on the choice of location of separate transducers caused by bending of the shaft in its free-free mode to be avoided.

Where a plurality of electromagnets are employed these may be formed by the provisions of the electromagnet coils on different portions of a common core in a known manner. The core may be shaped and laminated in known manner. For example, it may be a solid ring shape with the object at the axis of the ring. The ring shape may have projections facing toward the axis some or all of the projections carrying the control coils. The core may be one of the other shapes well known in this field.

In apparatus according to the present invention comprising two electromagnets each having a feedback loop controlling a parameter relating to the relative position of the object, the control signal producer for producing an error control signal for each loop may comprise a single circuit common to the feedback loops associated with both electromagnets. The control signal producer may have an output which is applied as a negative signal to the electric supply device of one electromagnet and as a positive signal to the electric supply device of the other electromagnet and vice versa (as appropriate). The output from the common circuit for each feedback loop may be applied in conjunction with an error control signal from a control signal producer dedicated to the control coil of the electromagnet with which it is associated.

The electric supply device for delivering current to the two electromagnets may comprise a common power amplifier driving two transistor devices each connected to one of the electromagnets and to a separate voltage source, the two voltage sources being of opposite polarity whereby the current changes applied to the two coils are equal and opposite. In this case only one feedback loop and error control signal is required as an input to the power amplifier.

Active bearings embodying the present invention may be employed in any applications requiring contactless, maintenance-free, non-lubricated bearings. Such applications include bearings for moving parts in machines handling dangerous materials, eg radioactive, explosive toxic or biologically active materials, high speed bearings for vacuum pumps, food processing (where lubricants would cause contamination), bearings for high temperature environments and bearings for low temperature environments (where oil and other lubricants would freeze).

Embodiments of the present invention will now be described by way of example with reference to the accompanying drawings, in which.

BRIEF DESCRIPTION OF THE DRAWINGS

DESCRIPTION OF THE PREFERRED EMBODIMENTS

Figure 1:
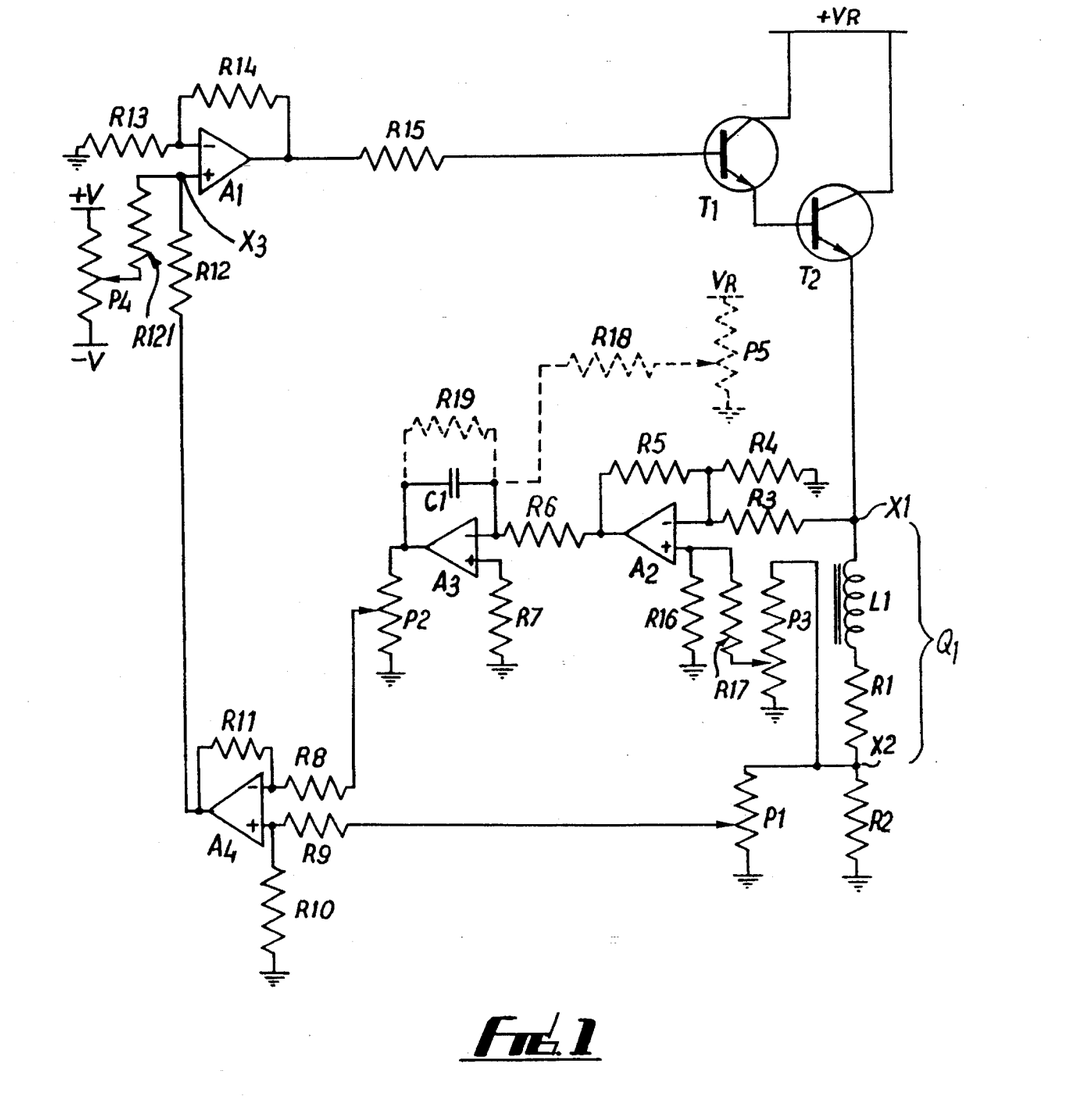
FIG. 1 is a circuit diagram of apparatus embodying the invention.

The control circuit embodying the invention shown in FIG. 1 measures by two connections across the terminals of a coil of an electromagnet the parameter $V_L$, integrates this to form $\int V_L dt$ and balances this term with a term $K_3 i$ to provide proportional control (and optionally also derivative control) as discussed above.

Considering FIG. 1 in more detail, the coil of an electromagnet controlling the suspension of an object (not shown) is represented by an inductance L1 in series with the coil's own resistance R1, the coil having terminals X1 and X2. The coil is supplied at its terminal X1 with a nominally or controllably fixed level d.c. supply by a high gain amplifier A1 driving through a resistor R15 a Darlington pair of transistors T1 and T2 connected to a supply voltage rail $+V_R$, T2 being connected to the coil at terminal X1. The terminal X1 of the coil is connected through a resistor R3 to one input terminal of an operational amplifier A2 the other input terminal of which is earthed through a resistor R16. The positive end of resistor R16 is also connected through a resistor R17 to the variable potential contact of a potentiometer P3 the positive end of which is connected to the other terminal X2 of the coil and the negative end of which is earthed. The terminal X2 of the coil is also connected to earth through a resistor R2 and to the positive end of a potentiometer P1, the negative end of which is earthed. A resistor R5 is connected between the output terminal of the amplifier A2 and the input terminal to the amplifier A2 from the resistor R3 which terminal is connected to earth through a resistor R4. The output of the amplifier A2 is connected through a resistor R6 to form one input terminal to an operational amplifier A3 the other input terminal of which is connected to earth through a resistor R7. A capacitor C1 is connected between the output of the amplifier A3 and the input of the amplifier A3 which is applied from the resistor R6. The output terminal of the amplifier A3 forms the positive end of a potentiometer P2 the negative end of which is earthed. The potentiometer P2 has a variable potential contact which is connected through a resistor R8 to form one input terminal of an operational amplifier A4. The potentiometer P1 has a variable potential contact which is connected through a resistor R9 to form the other input terminal of the amplifier A4, that terminal also being connected to earth through a resistor R10. A resistor R11 is connected between the output of the amplifier A4 and the input to the amplifier A4 from the resistor R8. The output terminal of the amplifier A4 is connected, to form a feedback loop, through a resistor R12 to one input terminal X3 of the amplifier A1, the other input terminal of the amplifier A1 being connected to earth through a resistor R13. The input to the amplifier A1 from the resistor R12 is connected through a resistor R121 to the variable potential contact of a potentiometer P4, the positive end of which is at a positive potential +V and the negative end of which is at a negative potential −V. A resistor R14 is connected between the output of the amplifier A1 and its input from the resistor R13.

The circuit component values are chosen so that the output of the amplifier A2 is due to pure inductance of the coil.

The output of amplifier A2 is integrated by the integrator comprising amplifier A3 and capacitor C1 and resistor R6 and a selected fraction of the signal representing the integrated output is balanced against an input representing the current through the coil obtained by selection of circuit component values.

Any output from amplifier A4 is therefore due to a difference between the integral of the component $V_L$ of V due to pure inductance and a chosen proportion of the resistive component of V and this output is employed as an error control signal via R12 and is applied to the input terminal X3 of amplifier A1, the terminal also being connected to a reference voltage obtained from the potentiometer P4. The value of resistor R14 is high compared with resistor R13 to make amplifier A1 have a high gain but is limited to a maximum of 1 MΩ to ensure that stability of operation of the circuit containing amplifier A1 is facilitated.

Figure 2:
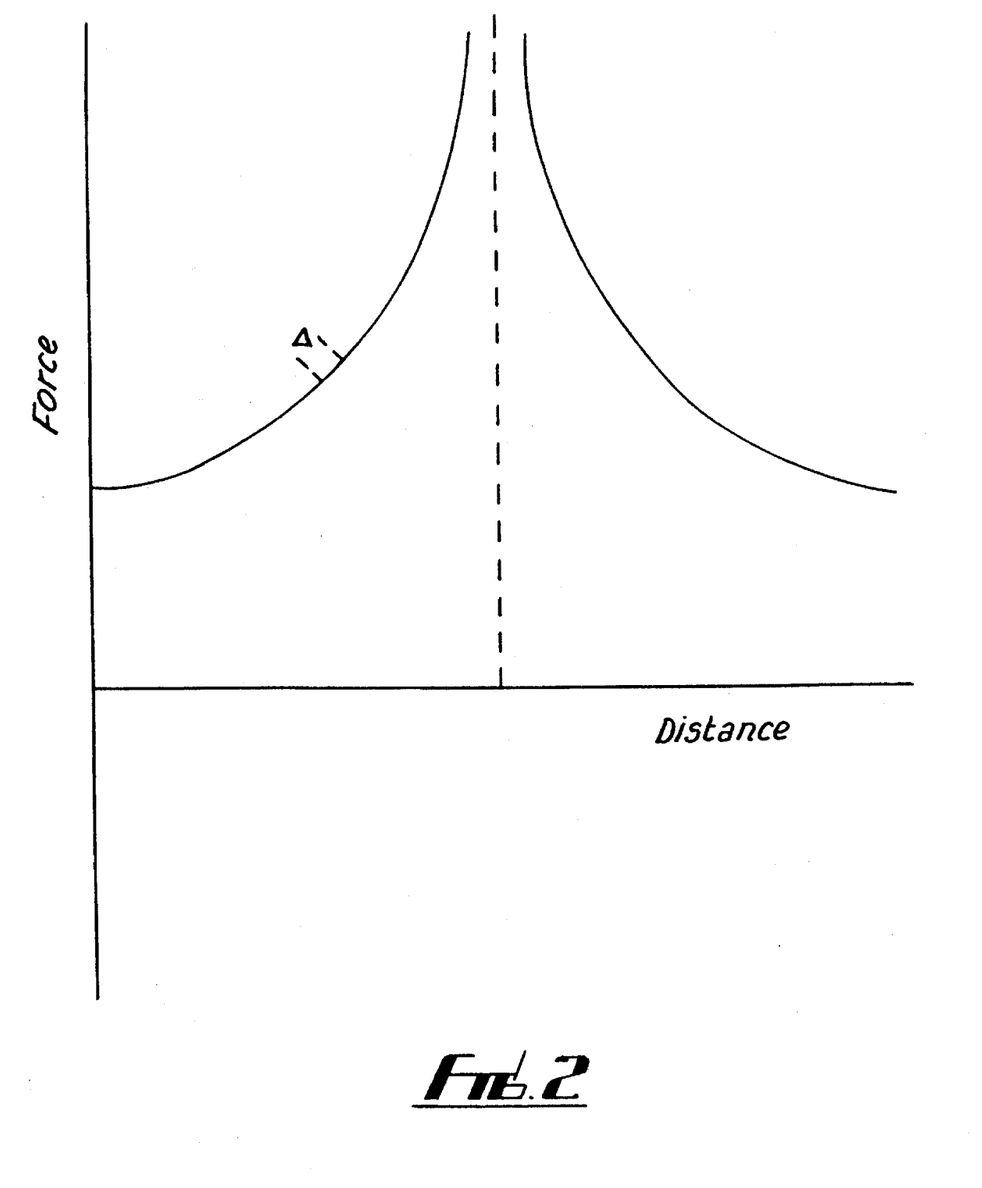
FIG. 2 is a graph of force versus distance for an object whose suspension is controlled by apparatus as shown in FIG. 1.

The circuit shown in FIG. 1 provides proportional feedback control of the suspension of the object in the manner specified with reference to Equations 1 to 10 above. The circuit provides a force versus distance curve for control of the object as shown in FIG. 2, which is a graphical representation of Equation 10. The working part of the curve is represented by the region Δ in which the curve approximates to the required linear relationship of positive slope.

In order to provide additionally derivative control of the suspension of the object, a positive component of current can be provided through the circuits comprising the amplifiers A2 and A3 in FIG. 1. This condition can be achieved by optionally adding the resistor R19 shown as a dashed line in FIG. 1, in parallel with the capacitor C1. Alternatively, the condition may be achieved by offsetting the potentiometer P3 to provide the current signal at the output of amplifier A2 and adding a resistor R18 and potentiometer P5, shown dashed in FIG. 1, to offset the steady state component of the output of amplifier A2. Where resistor R18 and potentiometer P5 are employed in this way potentiometer P4 is not required.

In the circuit shown in FIG. 1 the feedback loop comprising the portion of the circuit between terminals X1 and X2 on the one hand and terminal X3 on the other hand will hereinafter be referred to as "Circuit Q1".

Figure 3:
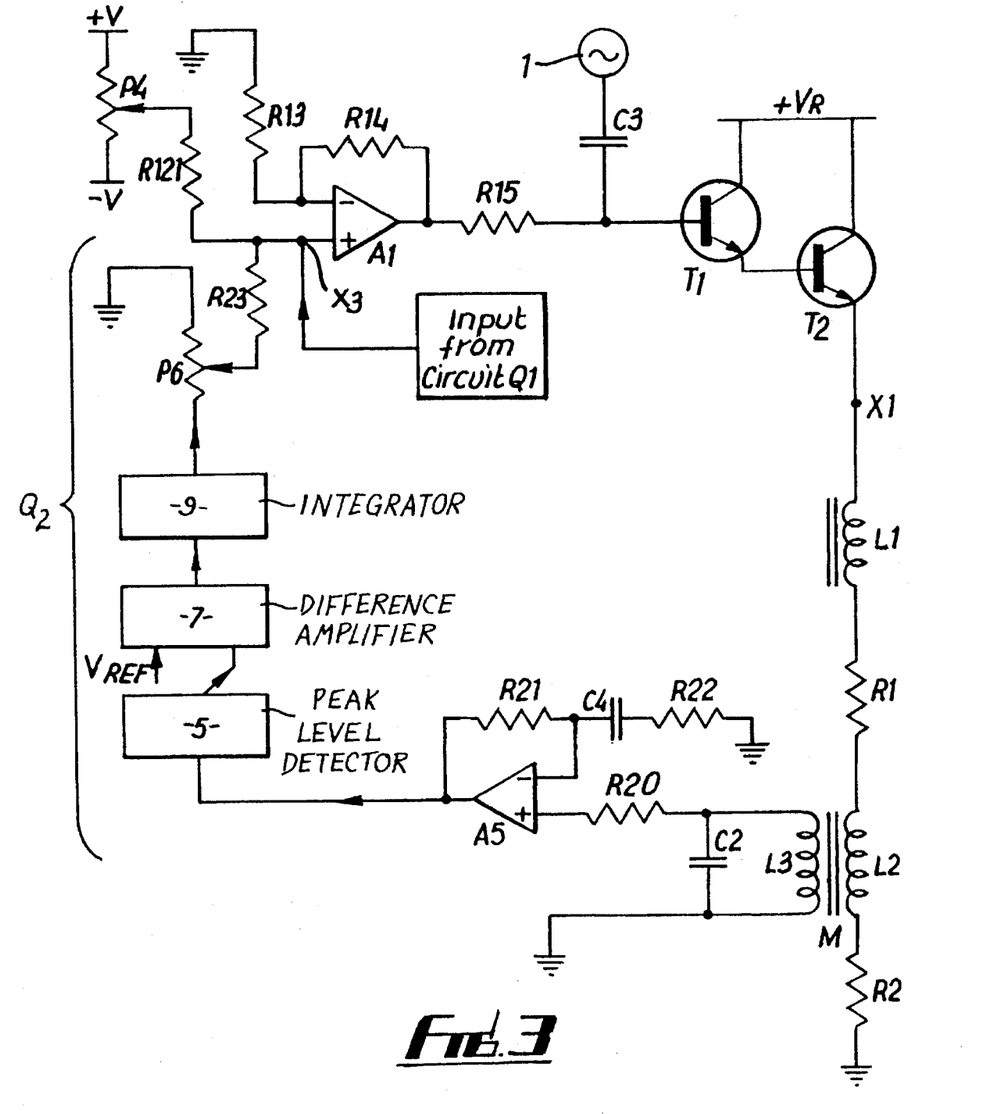
FIG. 3 is a circuit diagram of an additional feedback loop circuit which may be employed in conjunction with the feedback loop in the apparatus shown in FIG. 1.

A further feedback loop which may optionally be employed to provide object position control by inductance measurement in addition to control by Circuit Q1 is the circuit shown in FIG. 3.

In FIG. 3, the amplifier A1, transistors T1 and T2, the coil of a control electromagnet represented by its inductance L1 and resistance R1, resistors R2, R13, R14, R15 and potentiometer P4 and resistor R121 are the same as the items having the same reference symbols in the circuit of FIG. 1. The coil of the control electromagnet is herein referred to as the 'control coil'.

Superimposed upon the nominally d.c. output of the amplifier A1 is, in FIG. 3, a 20 kHz a.c. signal provided by an oscillator 1 connected to the base of the transistor T1 through a capacitor C3. The oscillator 1 and capacitor C3 could alternatively be applied as an input to the amplifier A1. The voltage applied across the control coil comprising L1 and R1 contains therefore a 20 kHz component of constant voltage amplitude. The impedance of the control coil varies with the air gap or separation between the electromagnet and object being controlled (not shown), and incremental changes in the air gap caused by incremental changes in the total force upon the suspended object result in a varying 20 kHz current component passing through the control coil. An air core transformer M comprises a further or primary coil having an inductance L2 (and an internal resistance not shown) in series with the inductance L1 and resistances R1 and R2, and a secondary coil having an inductance L3 connected in an output circuit to a capacitor C2. The components of the output circuit are chosen so that the circuit is resonant at the frequency of the oscillator 1. The resonant output circuit picks up by mutual induction in the secondary coil of inductance L3 a voltage related only to the 20 kHz component of current flowing through the control and primary coils of inductance L1 and L2. Because the amplitude of the applied alternating voltage component is constant, the induced voltage represents a measurement at the applied frequency of the impedance of the control coil and hence any change in the measured induced voltage can be sensed to provide control of the gap between the control electromagnet and controlled object.

The amplitude of the 20 kHz component of voltage across the capacitor C2 is detected as follows. The voltage is applied via a resistor R20 providing a high input impedance to one input terminal of an amplifier A5 whose other input terminal is connected via a capacitor C4 through a resistor R22 to earth. A resistor R21 is also connected between the output of the amplifier A5 and the capacitor C4. The circuit comprising the amplifier A5 acts as a buffer to lower the impedance of the transformer output. The peak amplitude at the output of the amplifier A5 is detected by a peak level detector 5 and the detected peak level is compared with a reference voltage $V_{REF}$ in an error detector or difference amplifier 7, the difference being provided as an output. The output signal from the error detector 7 comprising an error signal is integrated by an integrator 9 whose output ramps until the error signal is zero, and the output of the integrator 9 is applied via a potentiometer P6 and a resistor R23 connected to the variable contact of the potentiometer P6 as an input at the input terminal X3 of the amplifier A1.

When the control coil experiences an incremental increase in impedance indicating an incremental decrease in the gap from the control electromagnet to the suspended object the control signal applied from the integrator 9 at the terminal X3 is negative so as to increase the gap to its desired mean level to maintain the stable position of the object. Likewise, when the impedance falls a positive control signal is applied at the terminal X3 causing the gap to be reduced. The level of the reference voltage $V_{REF}$ is selected so as to define the required mean stable gap between the control electromagnet and controlled object.

The feedback loop from the transformer M to the input terminal X3 will hereinafter be referred to as "Circuit Q2". The feedback loop comprising the Circuit Q1 is applied in parallel with Circuit Q2 from the control coil to the amplifier A1, the inputs from both feedback loops being applied together at terminal X3 to the amplifier A1.

Figure 4:
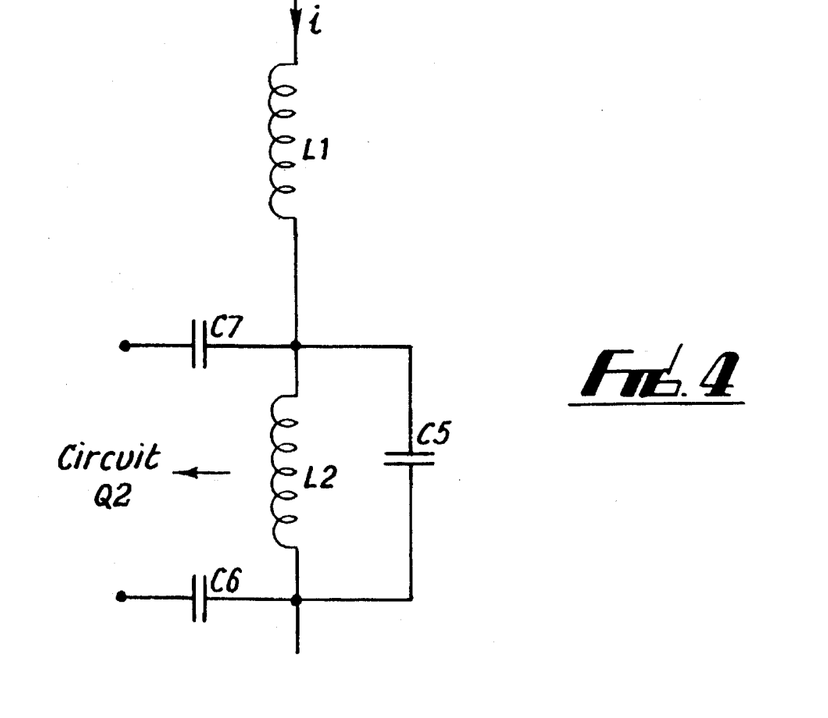
FIGS. 4 and 5 are circuit diagrams of alternative arrangements for the feedback loop shown in FIG. 3.
Figure 5:
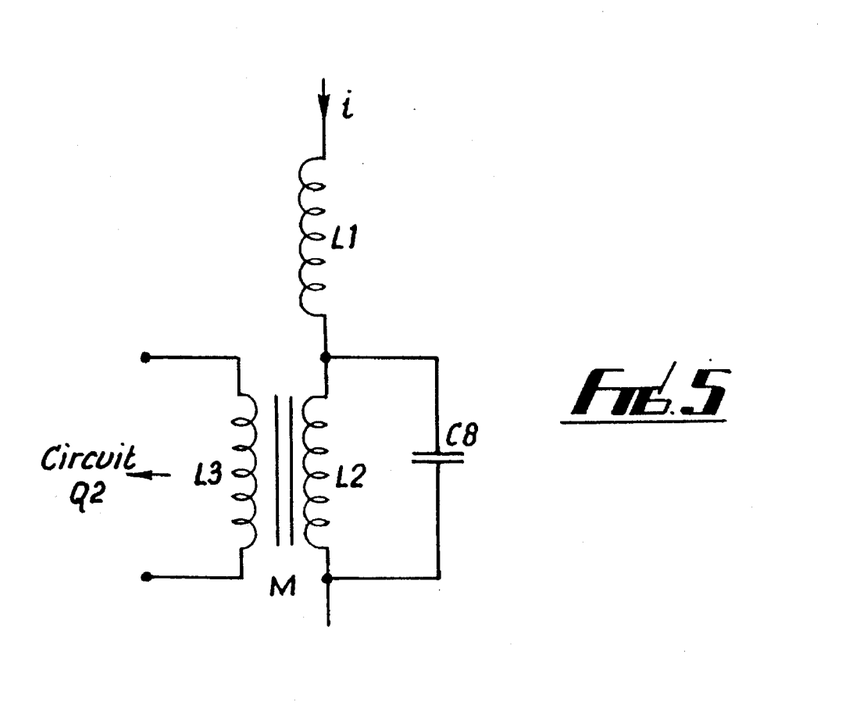

FIGS. 4 and 5 show alternative ways of deriving the input voltage to the amplifier A5 via resistor R20 in FIG. 3.

In FIG. 4 the second coil represented by L2 (connected in series with L1) is not part of a transformer but is itself connected to a capacitor C5 selected to give a resonant circuit with the coil L2. The voltage across the terminals of coil L2 is isolated via isolating capacitors C6, C7 and forms the input to Circuit Q2 via resistor R20 and amplifier A5 in the manner shown in FIG. 3.

Figure 6:
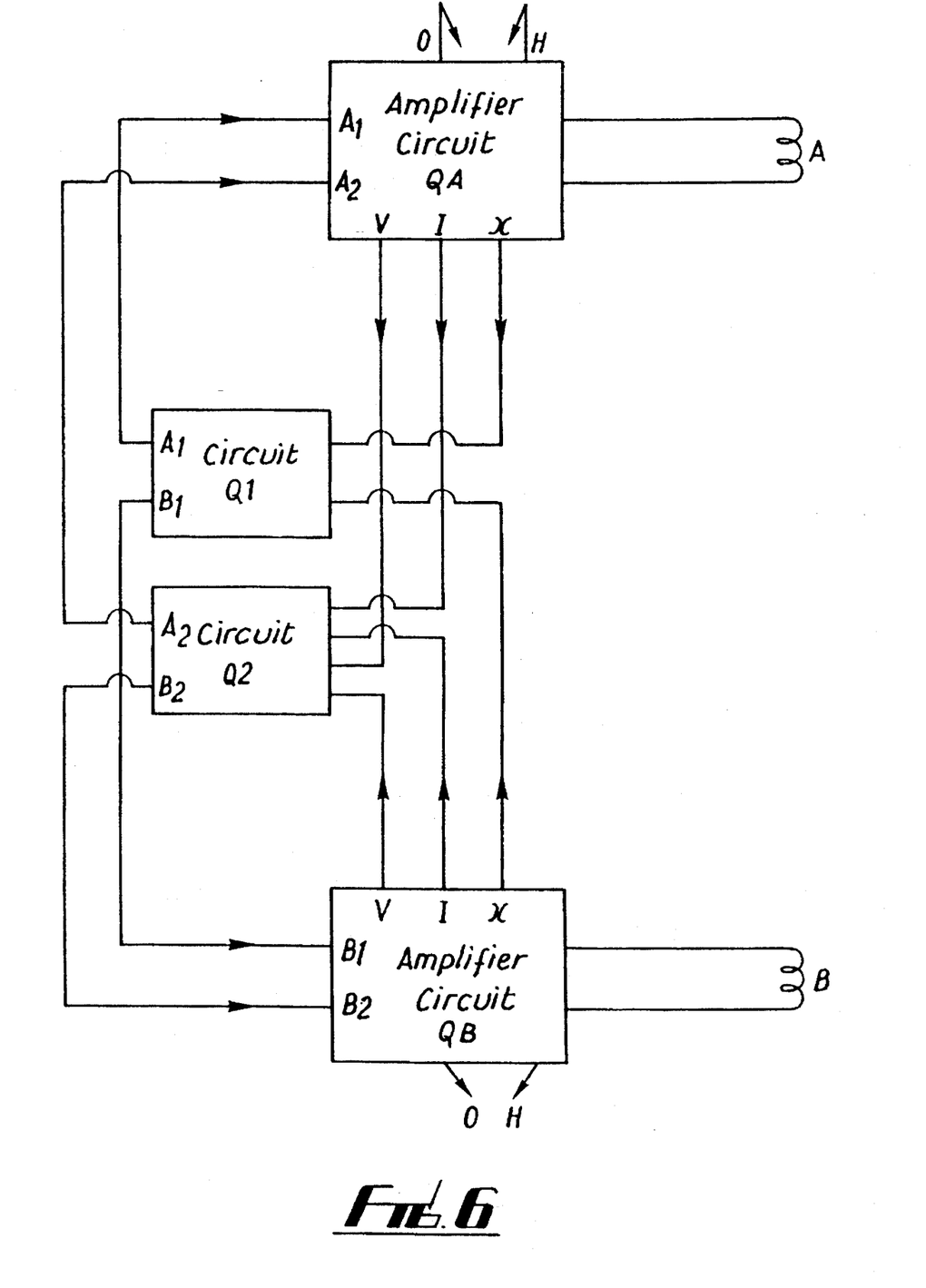
FIG. 6 is a block circuit diagram of apparatus embodying the present invention including two active electromagnets for controlling the suspension of an object.
Figure 7:
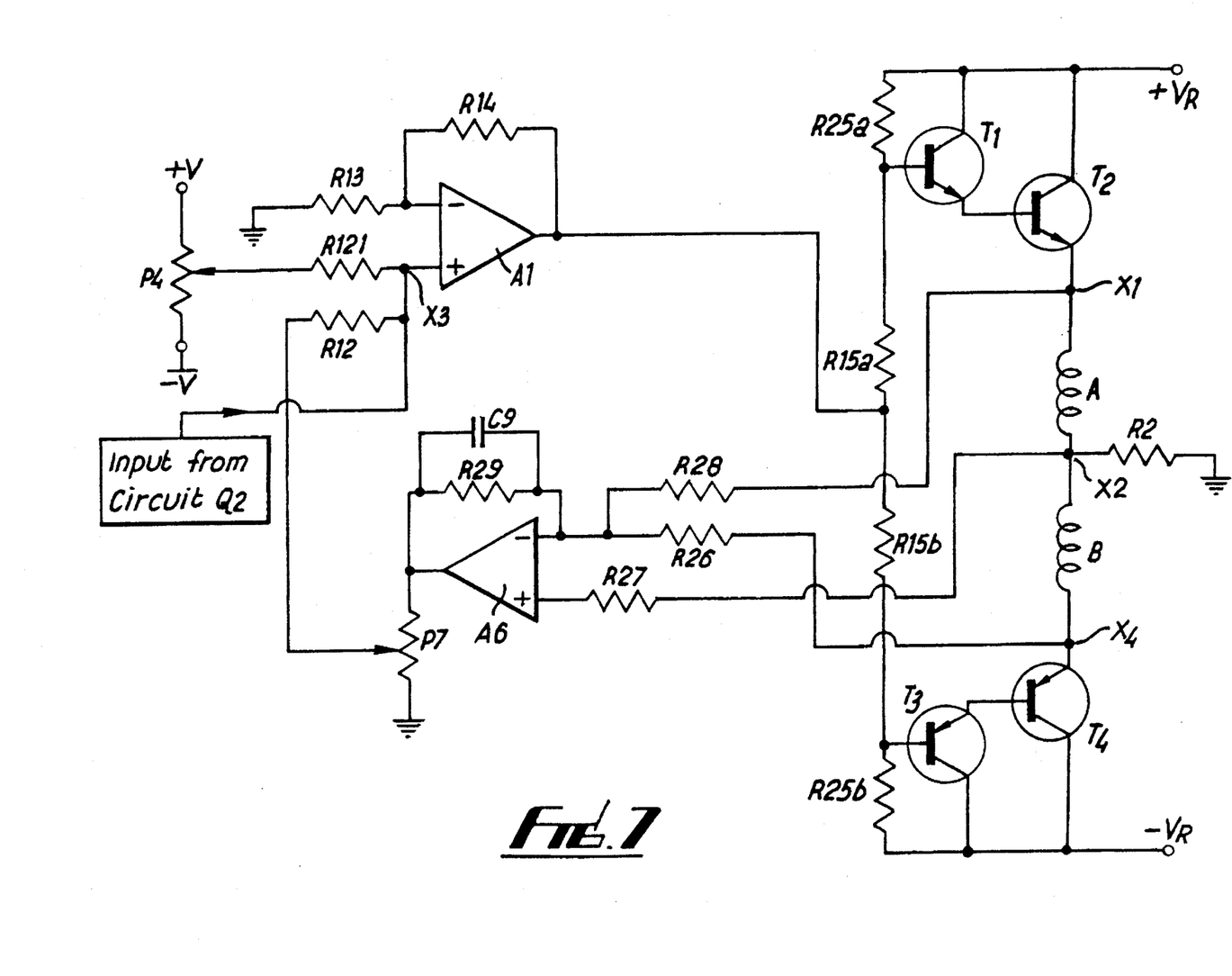
FIG. 7 is a circuit diagram of alternative apparatus embodying the present invention including two active electromagnets for controlling the suspension of an object.

In FIGS. 4 and 5 and in FIGS. 6 and 7 which follow the internal resistance of the coils is not shown.

In FIG. 5 the second coil represented by L2 (connected in series with L1) is again the primary coil of a transformer M together with a secondary coil represented by L3 but in this case the capacitor, here C8, required for the resonant circuit is connected across the primary coil L2. The voltage across the terminals of coil L3 forms the input to Circuit Q2 via resistor R20 and amplifier A5 in the manner shown in FIG. 3.

FIG. 6 shows an example of how Circuits Q1 and Q2 may be combined and employed to influence two control coils A, B. The control coils may together form a pair for example mutually controlling in an active bearing the position in one dimension of the axis of a rotating steel shaft (not shown). In practice there would be a known geometrical arrangement of the coils and the object being controlled to permit this. In FIG. 6, the amplifier A1 (and its associated input resistances and reference voltage), the transistors T1 and T2, the capacitor C1 and the connections from the coil A to the Circuits Q1 and Q2 are all embodied within an amplifier circuit QA providing input current to the coil A. Likewise, a similar arrangement of components is embodied within an amplifier circuit QB providing input current to the coil B. Variations in the voltage across each coil A, B, indicated in FIG. 6 as V and, variations in the current through each coil A, B, indicated as I, are detected respectively by the Circuit Q1 as described above operating jointly upon the two pairs of inputs. Variations in the impedance of each coil A, B indicated in FIG. 6 as x (because impedance is measured to control gap x) are detected respectively by the Circuit Q2 as described above operating jointly on the two inputs. An error control signal is generated by the Circuit Q1 in the manner described above with reference to FIG. 1, with the additional feature, provided by a logic unit (not shown) within Q1 applied to the output of Q1, that where the output to be applied to the amplifier circuit QA is positive the same error control signal but with a negative sign is applied to the amplifier circuit QB, and vice versa. Likewise, an error control signal is generated by the Circuit Q2 in the manner described above with reference to FIG. 3, again with the additional feature that this signal is applied both to the amplifier circuit QA and the amplifier circuit QB except that the sense of the signal applied to QA is positive when that applied to QB is negative and vice versa. The error control signal outputs of the circuit Q1 shown respectively as A1 and B1 in FIG. 6 are equal and of opposite sense, as applied to the respective amplifiers of the amplifier circuits QA, QB, so that the incremental changes required to the input current and voltage applied to the respective coils A, B to provide proportional and derivative control of the suspension of the object are equal and opposite. The control signal outputs of the circuit Q2 shown respectively as $A_2$ and $B_2$ are equal and of opposite sense, as applied to the respective amplifiers of the amplifier circuits QA, QB so that the incremental electric supply changes required to the respective coils A, B to stabilise the gap between the control electromagnets and the controlled object at a selected mean (integral control), are equal and opposite.

In FIG. 6, two input connections O and H are shown to the Circuits QA and QB and represent connections respectively to a high current supply and oscillator. These are equivalent to the input from voltage source $V_R$ and a.c. from the oscillator 1 in FIG. 3.

In another embodiment of the invention (not shown) two further feedback loops each comprising further separate Circuits Q1 may be employed in addition to the joint Circuit Q1 shown in FIG. 4 individually to provide independent control of the rate of change of position of the controlled object by the control coils A, B.

In a control system comprising feedback control for a pair of electromagnets there has to be a small bias current flowing in the coils of the electromagnets when there is no mechanical load present. This comes from the square law relationship between Force and Flux (Equation 9). If there were no current, and thus no Flux, the slope of the Force v Flux curve would be zero. Consequently, for small disturbances, there would be no restoring force, ie no stiffness.

The two coils pulling against one another are therefore set up with a bias current, or flux, to produce an operating point for each that is some way up the Force v Flux curve.

For each amplifier (in a system controlling two coils) to operate correctly it is preferred that it has its own independent feedback loop. If this were not the case, the two high gain amplifiers A1 would have to be very closely matched so that the very small (approaching zero) inputs would produce equal amplitude but opposite polarity outputs.

FIG. 7 shows an alternative circuit in which two control electromagnets represented by their control coils A and B are employed together to provide proportional control of the suspension of an object in one dimension. (In practice the coils A and B would be arranged to face one another with the object in between). In this case from the voltage V across and current i through the coil the parameters V' and i' as defined above are derived in the provision of proportional control.

Coil A is energised by a circuit comprising an amplifier A1 the same as that shown in FIG. 1 driving a Darlington pair of transistors T1 and T2 also as in FIG. 1 through a resistor R15a. The transistors T1 and T2 are n-p-n transistors. The amplifier A1 is again connected to resistors R12, R121, R13 and R14 and resistor R121 is connected to the variable contact of potentiometer P4 all as in FIG. 1.

Coil B is energised by the same amplifier circuit comprising the amplifier A1 resistors R12, R121, R13 and R14 and potentiometer P4 but in the case of Coil B the amplifier circuit drives a Darlington pair of p-n-p transistors T3 and T4 through a resistor R15b. The parameters $\int V_L dt$ and iR for each of the coils A and B are balanced against each other in the manner described above by a common circuit comprising an operational amplifier A6. The amplifier A6 has one input connected via a resistor R27 from terminal X2 which is a common node between the two coils A, B the terminal X2 also being earthed via a resistor R2. The other input to the amplifier A6 is connected jointly to the input terminal X1 of the coil A through a resistor R28 and the input terminal X4 of the coil B, ie the terminal at which the Coil B is connected to the transistor T4, through a resistor R26. A resistor R29 and capacitor C9 are connected between the output terminal of the amplifier A6 and the input terminal of the amplifier A6 connected to the resistors R26, R28.

A fraction of the signal provided as an output from the amplifier A6 is obtained from a potentionmeter P7 connected to the output of amplifier A6 and employed as an error control signal in a single feedback loop applied at the terminal X3 to the amplifier A1 via the resistor R12 giving proportional control by both coils A and B of the controlled object (not shown) each in an opposite sense in the manner described above. An input from Circuit Q2 (as in FIG. 3) may also be applied at the terminal X3.

A resistor R25a is connected between the base of the transistor T1 and the positive voltage rail $+V_R$ and, similarly, a resistor R25b is connected between the base of the transistor T3 and the negative voltage rail $-V_R$. The resistors R25a and R25b allow current to be passed from the rail $+V_R$ to the rail $-V_R$ through resistors R15a and R15b. This develops a voltage across resistors R15a and R15b which causes a bias current to flow through the coils A and B.

Figure 8:
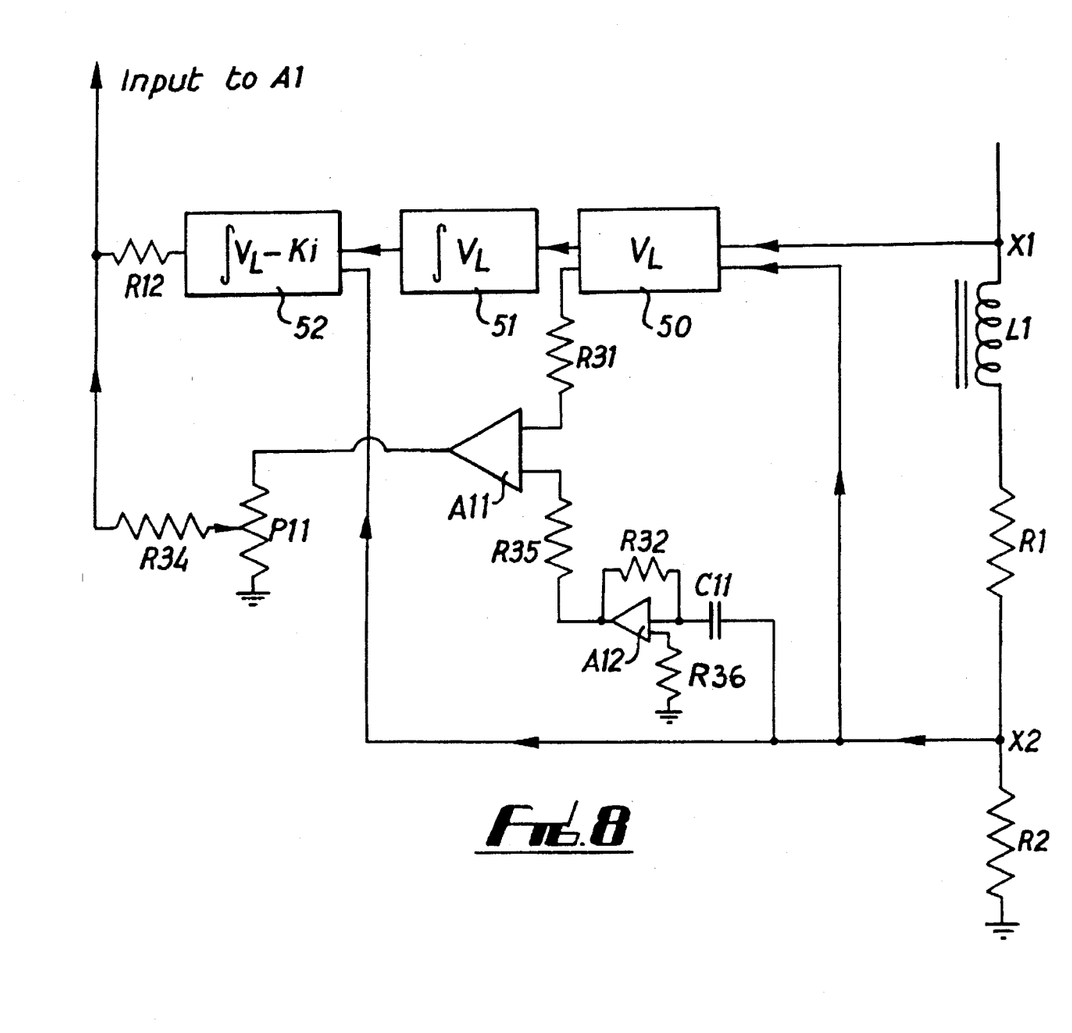
FIG. 8 is a circuit diagram of further apparatus embodying the present invention.

FIG. 8 is a circuit diagram of further apparatus embodying the present invention. In this case separate control loops are provided to apply both stiffness and damping control to the oscillations obtained when an object controlled electromagnetically by a single coil experiences a perturbation in the applied force acting upon the object. In FIG. 8 the items X1, L1, R1, X2 and R2 are the same as those with the same reference characters shown in FIG. 1. Furthermore in FIG. 8 part of the feedback loop circuit and sensor components from points X1 and X2 to amplifier A1 (via resistor R12) is essentially the same as in FIG. 1 but in the case of FIG. 8 it is shown in simplified form. Thus, the three parameters derived sequentially by the control signal producer and feedback loop embodied in the circuit of FIG. 1 viz the inductive voltage $V_L$, the integral of $V_L$ and the integral of $V_L$ minus a constant k times current i are represented by the boxes 50, 51, 52 respectively. In addition, the signal representing $V_L$ (obtained from amplifier A2 in FIG. 1) is applied in FIG. 8 via a resistor R31 as one input to an amplifier A11 the other input to which is the output, applied via a resistor R35, of a differentiator comprising an amplifier A12 having one input applied from the point X2 through a capacitor C11 and the other connected to earth via a resistor R36 and having a resistor R32 connected between the output of the amplifier A12 and its input from the capacitor C11.

The output of the amplifier A11 is applied to a potentiometer P11 and through a resistor R34 is combined with the signal representing $\int V_L dt - ki$ (output from the amplifier A4 shown in FIG. 1) to be applied via resistor R12 to the amplifier A1 of FIG. 1.

The loop deriving $\int V_L dt - ki$ essentially provides stiffness in the oscillations of the suspended object following a perturbation in the force on the object. The loop shown in FIG. 8 which is additional to that shown in FIG. 1 derives the parameter $V_L - K di/dt$, which as explained earlier, provides damping of oscillations caused by perturbations.

Figure 9:
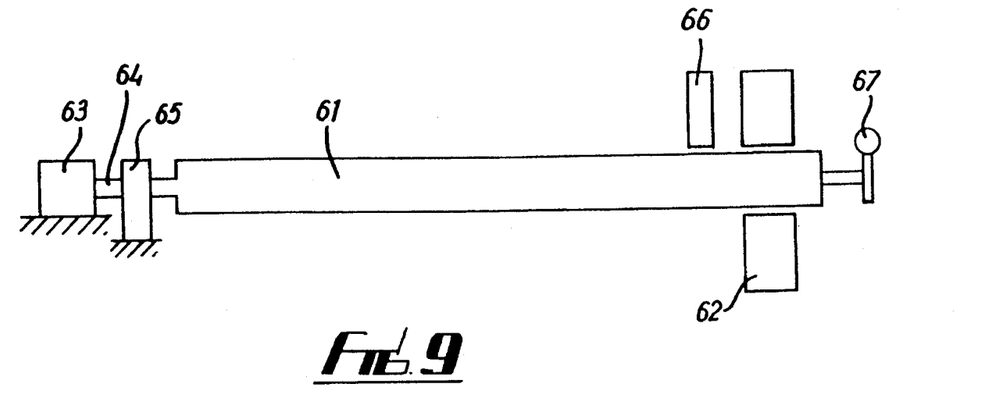
FIG. 9 is a side view of an experimental arrangement to compare the properties of a control system embodying the invention with those of a conventional system.

In order to demonstrate that stiffness and damping obtained by use of a system embodying the invention are at least as good as those obtained with a conventional system employing a position transducer and a feedback loop to control current the following experiment was carried out. A magnetic bearing rig comprised a new transducerless control system of the form shown in FIG. 8, called "NS", controlling movement of a shaft along one axis (perpendicular to the axis of the shaft) and a conventional system, called "CS", employing a position transducer controlling movement along an orthogonal axis. As shown in FIG. 9 the shaft indicated by numeral 61 was driven by a motor 63 through a flexible coupling 64 and self-aligning bearing 65. The magnetic bearing is indicated by its electromagnet coils as reference numeral 62 and the position transducer is indicated by reference numeral 66.

Figures 10A, 10B, 10C, 10D:
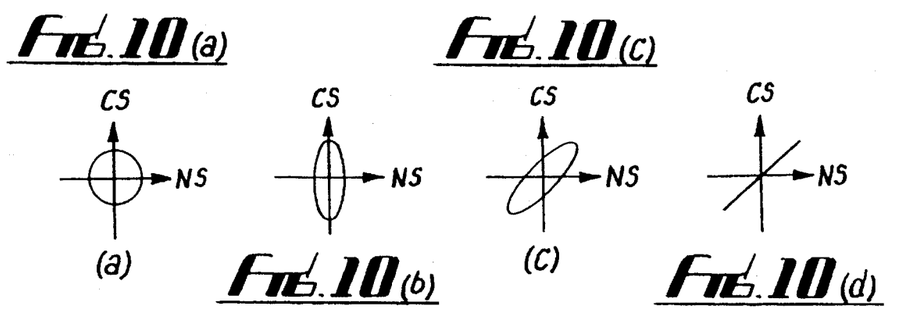
FIG. 10a–10d are a series of figures representing oscilloscope display traces obtained by using the arrangement shown in FIG. 9.

An eccentric mass 67 (which could be changed in mass value) was attachable to the free end of the shaft 61. With the eccentric mass 67 spinning with the shaft 61 the force disturbances to each system (ie NS and CS) are displaced by 90 degrees. These are represented by the respective axes of the traces shown in FIGS. 10a to 10d. If the two systems ie NS and CS have the same stiffness and the same damping the resulting display on the oscilloscope, in X-Y mode, must be a circle as illustrated in FIG. 10a. If the display shows a symmetrical ellipse as in FIG. 10b about one axis or the other (horizontal or vertical) then the damping ratio of each system is the same but one system has lower mechanical impedance than the other. Finally, if the display shows an asymmetrical ellipse oblique relative to the horizontal and vertical axes as shown in FIG. 10c or an oblique straight line as in FIG. 10d then the damping ratios of the two systems are different. In the case of the straight line, it shows that the phase angle between force and movement on one system is 90 degrees different from the phase angle of the other (FIG. 10d).

The new system NS was seen to provide an improved control. The mechanical impedance was observed to be the same as for the conventional system CS at most frequencies (as shown by a circle) and was found to be 25% and 65% lower at 15 and 20 Hz respectively as shown by an ellipse whose height was greater than its width (the ellipse being of the type shown in FIG. 10(b) and 10(c) respectively). This is in addition to the other benefits obtained by virtue of the new system NS being transducerless as described above.

We claim:

1. An apparatus for the electromagnetic control of the suspension of an object including:

an electromagnet including an inductive coil, a source of electric power for the electromagnet which source includes a controllable electric supply device capable of delivering a controlled electric supply to the coil of the electromagnet, a control signal producer for producing an error control signal in response to an incremental change in a parameter related to the position of the object relative to the electromagnet, and a negative feedback control loop for feeding said error control signal generated by the control signal producer to said source of electric power to adjust the electric supply to the coil so as to stabilize the suspension of the object relative to the electromagnet, wherein said control signal producer includes:

means for detecting a component $V_L$ of voltage across the coil which is a function of pure inductance L of the coil, means for detecting a current i flowing through the coil, means for deriving, from the detected value of $V_L$ and the detected value of i, opposing signals, and means for balancing said opposing signals whereby said error control signal generated by the control signal producer represents a deviation from perfect balance of said opposing signals and comprises a correction signal applied to the electrical supply device for restoring said balance.

2. An apparatus as in claim 1 wherein the control signal producer is such that in operation balancing of said opposing signals provides at least one of proportional control and derivative control of the suspension of the object, where control, required to balance a perturbation caused by a random disturbance to the suspension of the object, is proportional control when proportional to the relative position of the object and is derivative control when proportional to the rate of change of the relative position of the object.

3. Apparatus as in claim 1 wherein said means for deriving said opposing signals includes derivation means by one of integration and differentiation with respect to time of one of the signals representing $V_L$ and i.

4. Apparatus as in claim 3 wherein said derivation means comprises a means for integrating a signal proportional to or representing the measured value of $V_L$ with respect to time and balancing said integrated proportional signal against a signal proportional to or representing the measured value of i for producing said error control signal giving proportional control.

5. Apparatus as in claim 1 wherein said deriving means comprises a means for balancing a signal proportional to or representing the measured value of $V_L$ against a time derivative of a signal proportional to or representing the measured value of i for producing said error control signal giving derivative control.

6. Apparatus as in claim 1 wherein the control signal producer includes at least two types of control provided together, the apparatus according to the present invention together comprising a plurality of parallel control signal producers and feedback loops for generating the respective pairs of opposing signals derived from $V_L$ and i and for providing a combination of error control signals to give the required forms of feedback control.

7. Apparatus as claimed in claim 6 wherein the control signal producers and loops include means which is such as to enable in operation the inductance of the coil of the electromagnet to be measured by the control signal producer to allow the electric supply to the coil to give integral control of the position of the controlled object.

8. Apparatus as in claim 1 wherein said electromagnet comprises a magnetic core carrying an inductive coil.

9. Apparatus as in claim 1 wherein said object is an object influenced by the magnetic field generated by said electromagnet.

10. Apparatus as claimed in claim 1 wherein the electric supply device comprises a power amplifier circuit connected to a fixed voltage source capable of providing a controlled direct current of a controlled level to the electromagnet.

11. Apparatus as claimed in claim 1 wherein the control signal producer includes means for measuring the voltage V across the coil of the electromagnet, and means for deriving from the measured values of V and i parameters V' and i' respectively which are the phase lagged versions of V and i.

12. Apparatus as claimed in claim 10 further including a second coil connected in series with said inductive coil so that the same current will flow through the inductive coil and the second coil, the second coil connected in a resonant circuit, and the apparatus further includes means for injecting through the inductive coil an a.c., signal having a frequency within the resonance peak of the resonant circuit.

13. Apparatus as claim 12 further including:

a means for measuring the amplitude of the alternating voltage across a component in the resonant circuit, an error detector for comparing the amplitude measured by the amplitude detector with a reference signal and an integrator for producing the time integral of error signals provided at the output terminal of the error detector, the output of the integrator being applied to an input of the controllable electric supply device.

14. Apparatus as claimed in claim 1 wherein the control signal producer is connected to the respective terminals of the electromagnet.

15. Apparatus as claimed in claim 14 wherein the control signal producer is for providing proportional control and includes a processing circuit which includes a first operational amplifier having its inputs provided by resistive connections to the terminals of the coil of the electromagnet, an integrator connected to the first operational amplifier so as to integrate its output, and a second operational amplifier having a first input terminal connected to the output terminal of the integrator and a second input terminal having a resistive connection to one of the terminals of the coil.

16. Apparatus as claimed in claim 15 wherein the processing circuit includes means for providing a positive current component in the processing circuit.

17. Apparatus as claimed in claim 1 in which the suspension of an object is controlled by a plurality of inductive coils.

18. Apparatus as claimed in claim 17 wherein the apparatus comprises an active electromagnetic bearing and said object comprises 19. Apparatus for the electromagnetic control of the suspension of an object including:

an electromagnet including at least one inductive coil, a source of electric power for the electromagnet which source includes a controllable electric supply device capable of delivering a controlled electric supply to the coil of the electromagnet, a control signal producer for producing an error control signal in response to an incremental change in a parameter related to the position of the object relative to the electromagnet and a negative feedback control loop for feeding said error control signal generated by the control signal producer to said source of electric power to adjust the electric supply to the coil so as to stabilize the suspension of the object relative to the electromagnet, wherein said control signal producer includes:

means for detecting a component $V_L$ of voltage across the coil which is a function of pure inductance L of the coil, means for detecting a current i flowing through the coil, means for deriving, from the detected value of $V_L$ and the detected value of i, opposing signals, and means for balancing said opposing signals whereby said error control signal generated by the control signal producer represents a deviation from perfect balance of said opposing signals and comprises a correction signal applied to the electrical supply device for restoring said balance wherein said at least one coil comprises two coils, each coil being connected to said electric supply device, and to said control signal producer, a feedback loop being provided from the control signal producer to said electric supply device, wherein said electric supply device for the two coils comprises:

two voltage sources; and a common power amplifier driving two transistor devices, each transistor device connected to one of the coils and one of the two voltage sources, the two voltage sources being of opposite polarity whereby the incremental current changes applied to the two coils are equal and opposite.

20. An apparatus for the electromagnetic control of the suspension of an object said apparatus including:

a first electromagnet including a first inductive control coil;

a second electromagnet including a second inductive control coil;

a source of electric power for each of the electromagnets, said source including:

a first controllable electric supply device for delivering a controlled electric supply to the first, coil; and a second controllable electric supply device for delivering a controlled electric supply to the second coil, a first control signal for producer for monitoring voltage across and current through the first, control coil and for producing, from the monitored voltage and current values, a first error control signal in response to an incremental change in a parameter related to the position, relative to the first electromagnet, of the object being suspended, a second control signal producer for monitoring voltage across and current through the second control coil and for producing, from the monitored voltage and current values, a second error control signal in response to an incremental change in a parameter related to the position, relative to the second electromagnet, of the object being suspended, and first, second third and fourth feedback control loops, the first loop being connected from the first control signal producer to the first controllable electric supply device, the second loop being connected from the second control signal producer to the second controllable electric supply device, the third loop being connected from the first control signal producer to the second controllable electric supply device and the fourth loop being connected from the second control signal producer to the first controllable electric supply device, wherein the first error control signal provided by the first control signal producer is connected in an equal but opposite manner to the first, and third loops, and the second error control signal provided by the second control signal producer is connected in an equal but opposite manner to the second and fourth loops.

21. Apparatus as in claim 20 and wherein the first and second control signal producers produce first and second error control signals, respectively, said first and second error control signals comprising a means for controlling the rate of change of position of the suspended object.

* * * * *